United States Patent Office 3,729,485
Patented Apr. 24, 1973

3,729,485
N-HALOALKENYLCYCLOAMIDINES
Hartmund Wollweber and Wilhelm Stendel, Wuppertal-Elberfeld, and Edgar Enders, Cologne, Germany, assignors to Farbenfabriken Bayer Aktiengesellschaft, Leverkusen, Germany
No Drawing. Filed Oct. 21, 1970, Ser. No. 82,828
Claims priority, application Germany, Nov. 4, 1969, P 19 55 481.5
Int. Cl. C07d 27/04
U.S. Cl. 260—326.85                 10 Claims

ABSTRACT OF THE DISCLOSURE

N-haloalkenylphenylcycloamidines, e.g. wherein each halogen atom of the alkenyl group is attached to a double-bonded carbon atom and wherein the phenyl group is substituted by from one to four halogen, trifluoromethyl, difluoromethyl, lower alkyl or alkenyl radicals, which possess acaricidal properties, especially animal acarid ectoparasiticidal properties, and processes for their preparation.

---

The present invention relates to and has for its objects the provision of particular new N-haloalkenylphenylcycloamidines, e.g. wherein each halogen atom of the alkenyl group is attached to a double-bonded carbon atom and wherein the phenyl group is substituted by from one to four halogen, trifluoromethyl, difluoromethyl, lower alkyl or alkenyl radicals, which possess acaricidal properties, especially animal acarid ectoparasiticidal properties, active compositions in the form of mixtures of such compounds with solid and liquid dispersible carrier vehicles, and methods for producing such compounds and for using such compounds in a new way especially for combating pests, e.g. parasites, especially animal acarid ectoparasites, with other and further objects becoming apparent from a study of the within specification and accompanying examples.

Certain phenylamidines, cyclic as well as non-cyclic, are already known but until now effectiveness against ticks has been found only in the case of non-cyclic phenylamidines. One such compound, having the Formula A shown hereinafter and disclosed in South African patent specification 66/4135, was withdrawn because of its instability. Of the cyclic amidines heretofore disclosed, of which the compound having the Formula B shown hereinafter and disclosed in U.S. patent specification 3,189,698 is the most closely related structurally to the active compounds according to the present invention, no ectoparasiticidal activity has hitherto been disclosed.

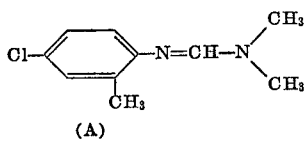

(A)

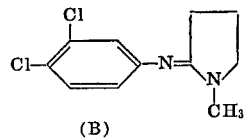

(B)

It has been found in accordance with the present invention, that the particular new N-haloalkenylphenylcycloamidines of the formula

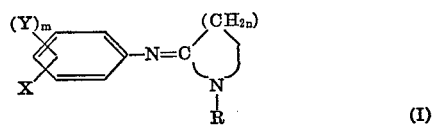

(I)

in which

R denotes a haloalkenyl radical with 3–7 carbon atoms in which each halogen atom is attached to a double-bonded carbon atom,
X denotes a halogen, trifluoromethyl, difluoromethyl, lower alkyl or alkenyl radical,
each Y independently denotes a halogen, trifluoromethyl, lower alkyl or alkenyl radical,
n is 3, 4 or 5, and
m is 0, 1 or 2, and their salts may be produced by several processes. In one of these, process variant (a), an aniline derivative of the formula

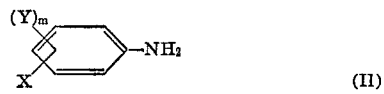

(II)

in which

X, Y and m possess the meanings stated above, is reacted with a haloalkenyl lactam of the formula

(III)

in which

R and n possess the meanings stated above, and
W denotes an oxygen or sulfur atom, or with a salt or suitable reactive derivative thereof, optionally in the presence of a condensation-promoting agent, the resulting N-haloalkenylphenylcycloamidine being converted to a salt thereof, if desired.

Referring to process variant (a), one type of reactive lactam derivative includes, for example, compounds containing the moiety

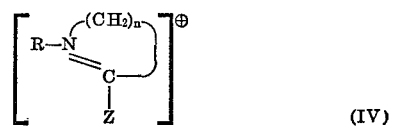

(IV)

in which

R and n possess the meanings stated above, and
Z denotes a reactive ester group or ether group.

These derivatives are obtained by the reaction of lactams or thiolactams of the formula

(V)

in which

R, W and n possess the meanings stated above, with inorganic acids (such as hydrogen chloride, boron trifluoride, sulfuric acid) or with inorganic or organic acid chlorides (such as phosphorus oxychloride, phosphorus pentachloride, phosgene, thionyl chloride, benzoyl bromide or a mixture of phosgene/aluminum chloride or phosgene/hydrogen chloride or phosgene/phosphorus oxychloride) or with trialkyloxonium fluorides or with dialkyl sulfates.

The lactim esters are usually then present as complex salts of the formula

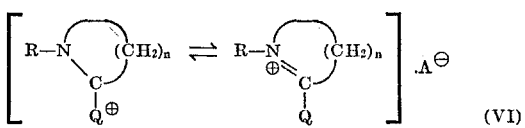

in which

R and $n$ possess the meanings stated above, and
Q and A denote, for example, the following groups:

| Q | A |
|---|---|
| O—POCl$_2$, S—POCl$_2$ | Cl |
| Cl | Cl, AlCl$_4$, HCl$_2$, POCl$_4$ |
| OSOCl | Cl |
| O—CO—C$_6$H$_5$, S—CO—C$_6$H$_5$ | Br, Cl |
| O—CO—Cl, S—CO—Cl | Cl |
| C$_6$H$_5$—SO$_2$—O—, Cl, Br | |
| O-alkyl | BF$_4$ |
| S-alkyl | OSO$_2$CH$_3$, Br, I, Cl |

In process variant (a) the reactions can be effected in such a manner that, from the lactams and, say, the acid halide, there is first prepared the reactive lactim ester, optionally in the presence of a substantially inert solvent, such as benzene, toluene or tetramethylenesulfone, and the substituted aniline is then added dropwise and, if desired, the reaction mixture is afterwards heated for a time.

It is, however, also possible to proceed by adding dropwise the acid halide, for example an acid chloride such as phosphorus oxychloride, to a mixture of the lactam and substituted aniline, optionally in the presence of a solvent, and afterwards heating the reaction mixture for a time. The acid halide here can be considered to be a condensation-promoting agent.

Another type of lactam derivative usable in process variant (a) involves an acetal of the formula

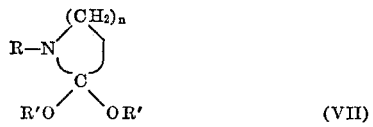

in which

R possesses the meaning stated above, and
each R' independently denotes an alkyl group, with a substituted aniline.

In an alternate process variant (b) a cyclic amidine of the formula

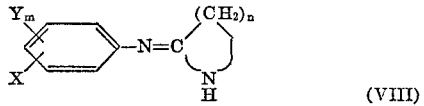

in which

X, Y and $m$ have the meanings stated above, is reacted with an alkenylating agent of the formula

B—R     (IX)

in which

R has the meaning stated above, and
B denotes a halogen or a reactive ester group, such as arylsulfonyloxy, for example benzenesulfonyloxy, tosyloxy or alkylsulfonyloxy, for example methanesulfonyloxy, the resulting N-haloalkenylphenylcycloamidine being converted to a salt thereof, if required.

It is also possible to react a thiolactam of the formula

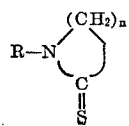

in which

R possesses the meaning stated above, with the substituted aniline in the presence of a desulfurizing condensation-promoting agent, such as HgO, Ag$_2$O or Hg(CN)$_2$.

Advantageously, the particular new compounds of Formula I, containing a haloalkenyl radical, are distinguished by much stronger activity against ticks, particularly against tick strains which have become resistant to phosphoric acid esters. The compounds according to the invention are, moreover, stable when applied in a cattle dip.

Advantageously in accordance with the present invention, in the various formulae herein:

R denotes a haloalkenyl containing 3–6 carbon atoms and 1 or 2 halogen atoms, especially allyl containing 1 or 2 chlorine atoms, X denotes fluorine, bromine, difluoromethyl, allyl, alkyl of 1 to 4 carbon atoms, or especially chlorine or trifluoromethyl, Y denotes bromine, fluorine or especially chlorine or methyl, $m$ is 0 or especially 1, and $n$ is 3.

The aniline derivatives suitable as starting materials include, for example:

2,4-dichloro-aniline,
3-bromo-4-chloro-aniline,
2,4-dibromo-aniline,
4-bromo-3-chloro-aniline,
2-bromo-4-chloro-aniline,
4-bromo-2-chloro-aniline,
4-fluoro-3-bromo-aniline,
4-fluoro-2-chloro-aniline,
4-chloro-2-methyl-aniline,
4-bromo-2-methyl-aniline,
4-chloro-2-ethyl-aniline,
4-bromo-2-ethyl-aniline,
4-chloro-3-methyl-aniline,
4-methyl-3-chloro-aniline,
4-methyl-3-bromo-aniline,
2-chloro-4-trifluoromethyl-aniline,
2-trifluoromethyl-4-chloro-aniline,
3-trifluoromethyl-4-chloro-aniline,
2-chloro-5-trifluoromethyl-aniline,
2-chloro-5-difluoromethyl-aniline,
4-chloro-3-difluoromethyl-aniline,
3-chloro-4-difluoromethyl-aniline,
3-difluoromethyl-aniline,
2-methyl-aniline,
3-methyl-aniline,
4-methyl-aniline,
2,3-dimethyl-aniline,
2,4-dimethyl-aniline,
2,5-dimethyl-aniline,
2-ethyl-aniline,
3-ethyl-aniline,
4-ethyl-aniline,
2-ethyl-3-methyl-aniline,
2-ethyl-4-methyl-aniline,
3-ethyl-2-methyl-aniline,
3-ethyl-4-methyl-aniline,
4-ethyl-3-methyl-aniline,
isopropyl-anilines,
n-butyl-anilines,
sec.-butyl-anilines,
tert.-butyl-anilines,
isopropyl-methyl-anilines,
butyl-methyl-anilines,
and the like.

As alkylating agents of the formula $$B-R \quad (IX)$$

there are mentioned for example:

1,3-dichloropropene,
1,2-dichloropropene,
1,2,3-trichloropropene,
1,3-dichloro-2-methyl-propene-(1),
1,3-dichloro-2-ethyl-propene-(1),
1,3-dichloro-2-propyl-propene-(1),
1,3-dichloro-2-isopropyl-propene-(1),
2,3-dichloro-2-methyl-propene-(1),
2,3-dichloro-2-ethyl-propene-(1),
2,3-dichloro-2-propyl-propene-(1),
2,3-dichloro-2-isopropyl-propene-1(1),
1,2,3-trichloro-2-methyl-propene,
1,2,3-trichloro-2-ethyl-propene,
1-chloro-3-tosyloxypropene-(1),
1-chloro-3-methanesulfonyloxy-propene-(1),
3-bromo-1-chloro-propene-(1),
1,3-dibromopropene,
and the like.

The active compounds according to the invention possess a basic character. They can be applied as the free bases or in the form of their salts, for example their hydrochlorides, sulfates, phosphates, nitrates, acetates or naphthalene-disulfonates.

The free bases, like the salts, exhibit strong acaricidal properties, especially against acarids which, as animal ectoparasites, infest domesticated animals, such as cattle and sheep. They are therefore well suited for the control of animal ectoparasites from the Order of the acarids. As ectoparasites of this nature which are economically important, especially in tropical and subtropical countries, there are mentioned for example: The Australian and South American cattle tick *Boophilus decoloratus*, both from the family of the Ixodidae.

In the course of time, the said ticks have in various areas become resistant to the phosphoric acid esters and carbamates used hitherto as control agents, so that the success of the control in these areas is rendered questionable. To safeguard economic livestock husbandry in the infestation areas, there exists therefore a need for agents with which ticks, even of resistant strains, for example the genus Boophilus, can be controlled with certainty. For example, in Australia the Ridgeland strain and the Biarra strain of *Boophilus microplus* are, to a great extent, resistant to the phosphoric acid esters and carbamates used hitherto. The active compounds according to the invention are equally effective both against the normally sensitive and the resistant strains, for example, of Boophilus. For example, on the adult forms they have a strong inhibitory effect on the depositing of eggs.

The active compounds according to the instant invention can be utilized, if desired, in the form of the usual formulations or compositions with conventional inert (i.e. plant compatible or herbicidally inert) pesticide diluents or extenders, i.e. diluents or extenders of the type usable in conventional pesticide formulations or compositions, e.g. conventional pesticide dispersible carrier vehicles, such as sloutions, emulsions, suspensions, emulsifiable concentrates, spray powders, pastes, soluble powders, dusting agent, granule, etc. These are prepared in known manner with conventional pesticide dispersible liquid diluent carriers and/or dispersible solid carriers optionally with the use of carrier vehicle assistants, e.g. conventonal pesticide surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: inert dispersible liquid diluent carriers, including inert organic solvents, such as aromatic hydrocarbons (e.g. benzene, toluene, xylene, etc.), halogenated, especially chlorinated, aromatic hydrocarbons (e.g. chloro-benzenes, such as o-dichlorobenzene, trichlorobenzene, etc.), paraffins (e.g. petroleum fractions), chlorinated aliphatic hydrocarbons (e.g. methylene chloride, etc.), alcohols (e.g. methanol, ethanol, propanol, butanol, etc.), amines (e.g. ethanolamine, etc.), ethers, ether-alcohols (e.g. glycol monomethyl ether, etc.) amides (e.g. dimethyl formamide, etc.), pyrrolidones (e.g. N-methyl-pyrrolidone-2), sulfoxides (e.g. dimethyl sulfoxides, etc.), ketones (e.g. acetone, etc.) and/or water; as well as inert dispersible finely divided solid carriers, such as ground natural minerals (e.g. kaolins, alumina, silica, chalk, i.e. calcium carbonate, talc,, kieselguhr, etc.) and ground synthetic minerals (e.g. highly dispersed dilicic acid, silicates, e.g. alkali silicates, etc.); whereas the following may be chiefly considered for use as conventional carrier vehicle assistants, e.g. surface-active agents, for this purpose: emulsifying agents, such as non-ionic and/or anionic and/or cationic emulsifying agents (e.g. polyethylene oxide esters of fatty acids, polyethylene oxide ethers of fatty alcohols, alkyl sulfonates, aryl sulfonates, etc., especially alkyl arylpolyglycol ethers, magnesium stearate, sodium oleate, quaternary ammonium salts of longer, e.g. $C_{6-20}$, alkyl radicals, etc.); and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially hygiene control or disinfectant agents, such as other parasiticides, or acaricides, insecticides, fungicides, bactericides, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95% by weight, and preferably 0.5–90% by weight, of the mixture, whereas carrier composition mixtures suitable for direct application or animal, e.g. livestock, application generally contemplate those in which the active compound is present in an amount substantially between about 0.001–5%, preferably 0.01–1%, by weight of the mixture. Thus, the present invention contemplates over-all compositions which comprise mixtures of a conventional dispersible carrier vehicle such as (1) a dispersible inert finely divided carrier solid, and/or (2) a dispersible carrier liquid such as an inert organic solvent and/or water preferably including a surface-active effective amount of a carrier vehicle assistant, e.g. a surface-active agent, such as an emulsifying agent and/or a dispersing agent, and an amount of the active compound which is effective for the purpose in question and which is generally between about 0.001–95%, and preferably 0.01–95%, by weight of the mixture.

It will be appreciated that the application concentrations are produced in connection with the above noted formulations normally by dilution with water. Furthermore, such concentrations can, according to the application form, be varied within a fairly wide range and are generally substantially between about 10 to 50,000 p.p.m. (g./g.), preferably between about 100 to 10,000 p.p.m., i.e. 0.001–5%, preferably 0.01–1%, as aforesaid.

Advantageously, the aqueous solutions or emulsions of the instant active compounds possess a markedly good stability under practical conditions, so that, even after standing for long periods at a pH in the range of from 7–9, such compounds may remain effective, i.e. even for three months or longer.

In particular, the present invention contemplates methods of selectively killing, combating or controlling pests, e.g. parasites, i.e. animal acarid ectoparasites, which comprises applying to at least one of correspondingly (a) such animal acarid ectoparasites, and (b) the corresponding habitat, i.e. the locus to be protected, e.g. the animal or livestock, a correspondingly combative or toxic amount, i.e. animal acarid ectoparasiticidally effective amount of the particular active compound of the invention alone or together with a carrier vehicle as noted above. The instant formulations or compositions are applied in the usual manner, for instance by spraying, atomizing, scattering, dusting, watering, i.e. as a bath (dip), sprinkling, pouring, and the like.

It will be realized, of course, that the concentration of the particular active compound utilized in admixture with the carrier vehicle will depend upon the intended application. Therefore, in special cases it is possible to go above or below the aforementioned concentration ranges.

The unexpected superiority and outstanding activity of the particular new compounds of the present invention are illustrated, without limitation, by the following examples:

EXAMPLE 1

In-vitro test on ticks for inhibiting effect on egg depositing 3 parts of active compound are mixed with 7 parts of a mixture of equal parts by weight of ethyleneglycol monomethyl ether and nonylphenol polyglycol ether. The emulsion concentrate so obtained is diluted with water to the application concentration desired in each case.

Adult, gorged female ticks of the species *Boophilus microplus* (resistant) are immersed for one minute in this preparation of active compound. After immersion of, in each case, 10 female specimens of the various strains of ticks, the individual ticks are transferred into plastic dishes, the bottom of which is covered with a filter paper disc. After 35 days, the effectiveness of the preparation of active compound is determined by ascertaining the inhibition of the depositing of fertile eggs compared with the egg deposition of untreated control ticks. The effect is stated in percent, 100% meaning that fertile eggs ceased to be deposited, and 0% meaning that the ticks have deposited eggs in normal manner like the untreated control ticks.

The active compounds investigated, the concentrations tried, the parasites tested and the findings obtained can be seen from the following Table 1:

TABLE 1

In-vitro test on ticks for inhibitory effect on egg depositing *Boophilus microplus* (Biarra strain)

| Active Compound | Inhibition at a concentration of active compound in percent by weight of— | |
|---|---|---|
| | 100% | >50% |
|  (A) (known) | 0.5 | 0.08 |
|  (B) (known) | 0.2 | 0.08 |
|  (1) | 0.03 | 0.01 |
|  (2) | 0.03 | 0.01 |
|  (3) | 0.01 | 0.005 |
|  (4) | 0.1 | 0.05 |
|  (5) | 0.1 | 0.03 |
|  (6) | 0.1 | 0.03 |
|  (7) | 0.01 | 0.003 |
|  (8) | 0.1 | 0.03 |
|  (9) | 0.01 | 0.003 |
|  (10) | 0.1 | 0.03 |
|  (11) | 0.1 | 0.03 |
|  (12) | 0.3 | 0.001 |

TABLE 1—Continued

| Active Compound | Inhibition at a concentration of active compound in percent by weight of— | |
|---|---|---|
| | 100% | >50% |
| 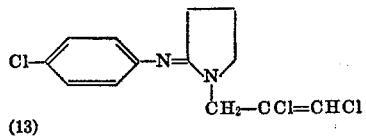 (13) | 0.3 | 0.05 |

The following examples illustrate the process of the present invention.

EXAMPLE 2

154 g. (1.0 mole) of phosphorus oxychloride are added dropwise at 20° C. to a solution of 141.5 g. (1.0 mole) of 2-chloro-4-amino-toluene and 159.5 g. (1.0 mole) of N-[3-chloroproprene-(2)-yl-(1)]-pyrrolidone in 1000 ml. of toluene; stirring is effected for 90 minutes at room temperature followed by heating under reflux for 4 hours until the splitting off of HCl has ended. After cooling, the toluene solution is decanted, the residue is taken up in water, rendered alkaline with a solution of sodium hydroxide, and the reaction product is extracted with a mixture of chloroform and ether. After evaporation of the solvent and distillation under reduced pressure, 244 g. 1 - [3 - chloropropene-(2)-yl-(1)]-2-(3-chloro-4-methyl-phenyl)-iminopyrrolidine of boiling point 170° C./0.2 mm. Hg are obtained.

By corresponding procedures, the following N-haloalkenylphenylcycloamidines are prepared as can be seen from the following Table 2:

TABLE 2

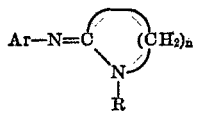
(XI)

| Ar | n | R | B.P., °C./mm.Hg | Compound No. |
|---|---|---|---|---|
| 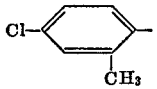 | 3 | —CH₂—CH=CHCl | 170/0.2 | (2) |
| 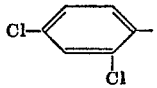 | 3 | —CH₂—CH=CHCl | 180/0.3 | (9) |
| 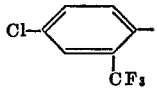 | 3 | —CH₂—CH=CHCl | 160/0.2 | (3) |
| 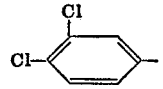 | 3 | —CH₂—CH=CHCl | 190/0.1 | (8) |
| 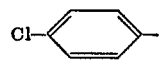 | 3 | —CH₂—CH=CHCl | 152/0.2 | (13) |
| 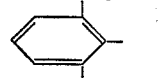 | 3 | —CH₂—CH=CHCl | 148/0.25 | (5) |
| 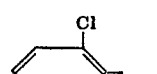 | 3 | —CH₂—CH=CHCl | 156/0.2 | (4) |
| 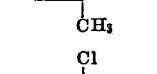 | 3 | —CH₂—CH=CHCl | 173/0.3 | (7) |
| 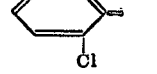 | 3 | —CH₂—CH=CHCl | 165/0.1 | (14) |
| 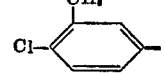 | 3 | —CH₂—CH=CHCl | 194/0.1 | (15) |
| 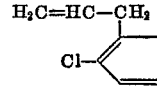 | 3 | —CH₂—CH=CHCl | 196/0.1 | (16) |

See footnotes at end of table.

TABLE 2—Continued

| Ar | n | R | B.P., °C./mm.Hg | Compound No. |
|---|---|---|---|---|
| 2,3-dimethylphenyl | 3 | —CH₂—CH=CHCl | 160/0.1 | (6) |
| 4-methylphenyl | 3 | —CH₂—CH=CHCl | 140/0.1 | (17) |
| 3-bromo-2-chlorophenyl | 3 | —CH₂—CH=CHCl | 190/0.1 | (18) |
| 3-chloro-2-bromophenyl | 3 | —CH₂—CH=CHCl | 192/0.1 | (19) |
| 3-chloro-2-(difluoromethyl)phenyl | 3 | —CH₂—CH=CHCl | 164/0.2 | (20) |
| 4-chloro-2-(difluoromethyl)phenyl | 3 | —CH₂—CH=CHCl | 160/0.2 | (21) |
| 3-bromo-4-chlorophenyl | 3 | —CH₂CH=CHCl | 184/0.1 | (22) |
| 3,4-dibromophenyl | 3 | —CH₂—CH=CHCl | 200/0.1 | (23) |
| 3-fluoro-4-chlorophenyl | 3 | —CH₂—CH=CHCl | 200/0.1 | (24) |
| 3-fluoro-4-bromophenyl | 3 | —CH₂—CH=CHCl | 180/0.1 | (25) |
| 4-chloro-3-fluorophenyl | 3 | —CH₂—CH=CHCl | 160/0.1 | (26) |
| 4-chloro-2-(trifluoromethyl)phenyl | 3 | —CH₂—CH=CHCl | 170/0.1 | (27) |
| 4-chloro-3-(trifluoromethyl)phenyl | 3 | —CH₂—CH=CHCl | 165/0.1 | (28) |
| 2-chloro-3-ethylphenyl | 3 | —CH₂—CH=CHCl | 185/0.2 | (29) |
| 2-chloro-3-propylphenyl | 3 | —CH₂CH=CHCl | 198/0.2 | (30) |
| 2-chloro-3-butylphenyl | 3 | —CH₂—CH=CHCl | 210/0.2 | (31) |
| 2,4-dichlorophenyl | 3 | —CH₂—CCl=CHCl | (¹) | (32) |

See footnotes at end of table.

TABLE 2—Continued

| Ar | n | R | B.P., °C./mm.Hg | Compound No. |
|---|---|---|---|---|
| 4-Cl, 2-CF₃-phenyl | 3 | —CH₂—CCl=CHCl | 165–170/0.3 | (11) |
| 2,6-di-Cl-phenyl | 3 | —CH₂—CCl=CHCl | ² 114/115 | (12) |
| 2,6-di-CH₃-phenyl | 3 | —CH₂—CCl=CHCl | (¹) | (10) |
| 4-Cl-phenyl | 3 | —CH₂—CCl=CHCl | (¹) | (13) |
| 3,4-di-Cl-phenyl | 3 | —CH₂CCl=CHCl | (¹) | (33) |
| 3-Cl-4-CH₃-phenyl | 3 | —CH₂—CCl=CHCl | (¹) | (34) |
| 3-CH₃-4-Cl-phenyl | 3 | —CH₂—CCl=CHCl | (¹) | (35) |
| 3,4-di-Cl-phenyl | 3 | —CH₂—CCl=CH₂ | 185/0.1 | (36) |
| 3-CH₃-4-Cl-phenyl | 3 | —CH₂—CCl=CH₂ | 160/0.1 | (37) |
| 3-Cl-4-CH₃-phenyl | 3 | —CH₂—CCl=CH₂ | 166/0.1 | (38) |
| 3-CH₃-4-Cl-phenyl | 3 | —CH₂—C(CH₃)=CHCl | 182/0.1 | (39) |
| 3,4-di-Cl-phenyl | 3 | —CH₂—C(C₂H₅)=CHCl | 207/0.1 | (40) |
| 3-Cl-4-CH₃-phenyl | 3 | —CH₂—CH=C(CH₃)(Cl) | 192/0.1 | (41) |
| 3-CH₃-4-Cl-phenyl | 3 | —CH₂—CH=C(C₂H₅)(Cl) | 203/0.1 | (42) |
| 3,4-di-Cl-phenyl | 3 | —CH₂—C(CH)=C(C₂H₅)(Cl) | 212/0.2 | (43) |
| 3-CH₃-4-Cl-phenyl | 3 | —CH₂—CCl=C(CH₃)₂ | 202/0.15 | (44) |
| 3,4-di-Cl-phenyl | 4 | —CH₂—CH=CHCl | 202/0.1 | (45) |

See footnotes at end of table.

TABLE 2—Continued

| Ar | n | R | B.P., °C./mm.Hg | Compound No. |
|---|---|---|---|---|
| 4-Cl, 2-CH₃-phenyl | 4 | —CH₂—CH=CHCl | 175/0.1 | (46) |
| 2-Cl, 4-CH₃-phenyl | 4 | CH₂—CH=CHCl | 174/0.1 | (47) |
| 4-Cl, 2-CF₃-phenyl | 4 | CH₂—CH=CHCl | 171/0.1 | (48) |
| 2,4-di-Cl-phenyl | 5 | CH₂—CH=CHCl | 210/0.1 | (49) |
| 4-Cl, 2-CH₃-phenyl | 5 | CH₂—CH=CHCl | 185/0.2 | (50) |
| 2-Cl, 4-CH₃-phenyl | 5 | CH₂—CH=CHCl | 188/0.2 | (51) |
| 4-Cl, 2-CF₃-phenyl | 5 | CH₂—CH=CHCl | 182/0.1 | (52) |

¹ Non-distillable oil.
² Melting point.

EXAMPLE 3

A solution of 99 g. of phosgene in 750 ml. of toluene is added dropwise to a solution of 141.5 g. of 2-chloro-4-aminotoluene and 159.5 g. of N-[3-chloropropene-(2)-yl-(1)]-pyrrolidone in 250 ml. of toluene; stirring is effected for 90 minutes at 20° C., followed by heating under reflux for 4 hours. After the working-up procedure described in Example 2, there are obtained 217 g. of 1-[3 - chloropropene - (2) - yl-(1)]-2-(3-chloro-4-methylphenyl)-iminopyrrolidine of boiling point 170° C./0.2 mm. Hg (Compound 1).

EXAMPLE 4

A solution of 35 g. of N-[3-chloropropene-(2)-yl-(1)]-thiopyrrolidone and 40 g. of 2-chloro-4-aminotoluene in 400 ml. of ethanol with the addition of 75 g. mercuric oxide is heated for 8 hours at 0° C. and then stirred vigorously for 15 hours at 10° C. Suction filtration from the precipitate is effected, the residue is distilled under reduced pressure and 11.3 g. of 1-[3-chloropropene-(2)-yl - (1)]-2-(3-chloro-4-methylphenyl)-iminopyrrolidine of boiling point 170° C./0.2 mm. Hg are obtained (Compound 1).

EXAMPLE 5

12.8 g. (0.115 mole) of 1,3-dichloropropene are added dropwise at 20° C. to 22.9 g. (0.1 mole) of 3,4-dichlorophenyliminopyrrolidine dissolved in 100 ml. of tetrahydrofuran and heating under reflux is subsequently effected overnight. Suction filtration from the precipitated sediment is effected (for the most part, 3,4-dichlorophenyl-iminopyrrolidine hydrochloride). The filtrate is washed several times with water. After separation of the organic phase, evaporation is effected, followed by distillation. A mixture is obtained of 1-[3-chloropropene-(2)-yl(1)]-2-(3,4-dichlorophenyl)-iminopyrrolidine and N-(3,4-dichlorophenyl) - N - [3-chloropropene-(2)-yl-(1)]-aminopyrroline of the respective formulae

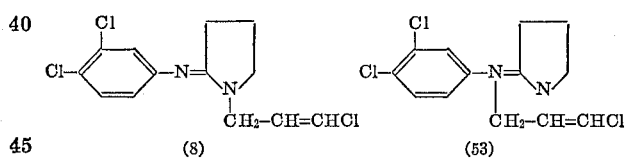

of boiling point 160–200° C./0.2 mm. Hg from which, after fractional distillation, the 1-[3-chloropropene-(2)-yl - (1)]-2-(3,4-dichlorophenyl)-iminopyrrolidine, boiling point 190° C./0.1 mm. Hg can be separated. Yield: 8.5 g.

EXAMPLE 6

14.5 g. of 2-chloro-4-aminotoluene and 20.2 g. of N-[3-chloropropene - (2) - yl - (1)]-pyrrolidonediethylacetal prepared from triethyloxoniumfluoroborate and N - [3-chloropropene - (2) - yl-(1)]-pyrrolidone are heated to 110°–140°; the alcohol liberated in the reaction distills within 30 minutes. The residue, after distillation in a vacuum, yields 22.1 g. of 1-[3-chloropropene-(2)-yl-(1)] - 2 - (3-chloro-4-methylphenyl)-iminopyrrolidine of boiling point 170°/0.2 mm. Hg (Compound 1).

It will be realized that all of the foregoing compounds contemplated by the present invention possess the desired selective pesticidal, especially parasiticidal, i.e. animal acarid ectoparasiticidal, properties for combating parasites, especially animal acarid ectoparasites, and that such compounds have only a very slight toxicity toward warm-blooded creatures.

It will be appreciated that the instant specification and examples are set forth by way of illustration and not limitation, and that various modifications and changes may be made without departing from the spirit and scope of the present invention.

What is claimed is:
1. An N-haloalkenyl-phenylcycloamidine of the formula

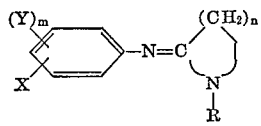
(I)

in which
R denotes a haloalkenyl radical with 3–7 carbon atoms in which each halogen atom is attached to a double bonded carbon atom,
X denotes a halogen atom, trifluoromethyl, difluoromethyl, lower alkyl with 1–4 carbon atoms of allyl,
each Y independently denotes a halogen atom, trifluoromethyl, lower alkyl with 1–4 carbon atoms or allyl,
m is 0, 1 or 2, and
n is 3, 4, or 5.
and salts thereof.

2. A cycloamidine according to claim 1 in which
R denotes haloalkenyl containing 3–6 carbon atoms and 1 or 2 halogen atoms,
X denotes chlorine, fluorine, bromine, trifluoromethyl, difluoromethyl, alkyl with 1–4 carbon atoms or allyl,
Y denotes chlorine, fluorine, bromine, trifluoromethyl, alkyl with 1–4 carbon atoms or allyl and m is 0 or 1.

3. Cycloamidines according to claim 1 in which
R denotes allyl containing 1 or 2 chlorine atoms,
X denotes chlorine or trifluoromethyl,
Y denotes chlorine or methyl,
m is 1, and
n is 3.

4. The hydrochloride, sulfate, phosphate, nitrate, acetate or naphthalenedisulfonate salt of an N-haloalkyl-phenyl-cycloamidine according to claim 1.

5. Compound according to claim 1 or a salt thereof wherein said compound is 1 - [3-chloropropene-(2)-yl-(1)]-2-(3-chloro-4-methylphenyl-iminopyrrolidine of the formula

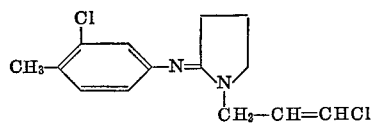
(1)

6. Compound according to claim 1 or a salt thereof wherein said compound is 1-[3-chloropropene-(2)-yl-(1)] - 2 - (2-methyl-4-chlorophenyl)-iminopyrrolidine of the formula

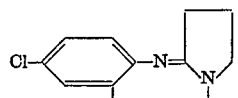
(2)

7. Compound according to claim 1 or a salt thereof wherein said compound is 1 - [3-chloropropene-(2)-yl-(1)] - 2-(2-trifluoromethyl-4-chlorophenyl)-iminopyrrolidine of the formula

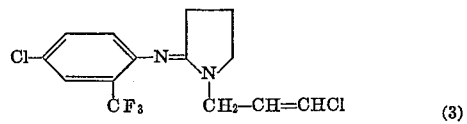
(3)

8. Compound according to claim 1 or a salt thereof wherein said compound is 1-[3-chloropropene-(2)-yl-(1)] - 2 - (2,6-dichlorophenyl)-iminopyrrolidine of the formula

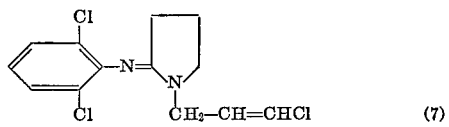
(7)

9. Compound according to claim 1 or a salt thereof wherein said compound is 1-[3-chloropropene-(2)-yl-(1)] - 2 - (2,4-dichlorophenyl)-iminopyrrolidine of the formula

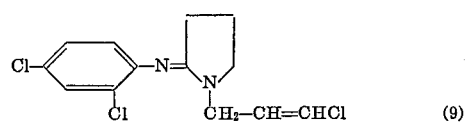
(9)

10. Compound according to claim 1 or a salt thereof wherein said compound is 1-[2,3-dichloropropene-(2)-yl-(1)] - 2 - (2,6-dichlorophenyl)-iminopyrrolidine of the formula

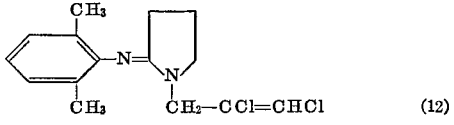
(12)

References Cited
UNITED STATES PATENTS
3,563,994   2/1971   Wollweber et al. _____ 260—293

ALEX MAZEL, Primary Examiner

J. A. NARCAVAGE, Assistant Examiner

U.S. Cl. X.R.
260—239B, 293.79; 424—274